United States Patent
Vosoughi et al.

(10) Patent No.: US 10,726,299 B2
(45) Date of Patent: Jul. 28, 2020

(54) SORTED GEOMETRY WITH COLOR CLUSTERING (SGCC) FOR POINT CLOUD COMPRESSION

(71) Applicant: Sony Corporation, Tokyo (JP)

(72) Inventors: Arash Vosoughi, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 16/107,598

(22) Filed: Aug. 21, 2018

(65) Prior Publication Data
US 2019/0114504 A1   Apr. 18, 2019

Related U.S. Application Data

(60) Provisional application No. 62/571,432, filed on Oct. 12, 2017.

(51) Int. Cl.
| | |
|---|---|
| G06T 9/00 | (2006.01) |
| G06T 15/00 | (2011.01) |
| G06K 9/46 | (2006.01) |
| H04N 13/15 | (2018.01) |
| G06K 9/62 | (2006.01) |
| G06T 7/90 | (2017.01) |
| H04N 9/67 | (2006.01) |
| H04N 19/46 | (2014.01) |

(Continued)

(52) U.S. Cl.
CPC ............ *G06K 9/622* (2013.01); *G06T 7/90* (2017.01); *H04N 9/67* (2013.01); *H04N 13/15* (2018.05); *H04N 13/161* (2018.05); *H04N 19/192* (2014.11); *H04N 19/46* (2014.11); G06T 2207/10016 (2013.01); G06T 2207/10028 (2013.01); H04N 5/247 (2013.01); H04N 2013/0077 (2013.01)

(58) Field of Classification Search
CPC .... G06K 9/622; G06K 9/4652; G06K 9/6223; G06K 9/6272; H04N 19/192; H04N 9/67; H04N 19/46; H04N 13/15; H04N 13/161; H04N 2013/0077; H04N 5/247; G06T 7/90; G06T 2207/10028; G06T 2207/10016
USPC ........................................................ 375/240
See application file for complete search history.

(56) References Cited

U.S. PATENT DOCUMENTS

8,938,119 B1 * 1/2015 Han ..................... G06T 5/008
                                                                                          382/163
9,691,006 B2 * 6/2017 Curington ............ G06K 9/6219
(Continued)

*Primary Examiner* — Susan E. Hodges
(74) *Attorney, Agent, or Firm* — Haverstock & Owens LLP (57) ABSTRACT

A point cloud compression approach that exploits HEVC for compression of both the geometry and color data is described herein. Although both the geometry and color could be compressed in a lossy fashion, the point cloud compression approach is suggested for the scenario of lossless geometry and lossy color coding. Both geometry and color data are first mapped into 2D images and then compressed by HEVC. A sorting technique is used to sort the geometry data to make it as correlated as possible when it is mapped to a 2D image. For color coding, clustering is used to put similar colors in a point cloud into spatial neighbors in the mapped 2D image. This significantly avoids color leaking due to quantization errors to neighbor points in 3D. The results show that much better compression is achieved compared to the Anchor when it is configured for lossless geometry coding.

24 Claims, 9 Drawing Sheets

(51) Int. Cl.
*H04N 13/161* (2018.01)
*H04N 19/192* (2014.01)
*H04N 13/00* (2018.01)
*H04N 5/247* (2006.01)

(56) References Cited

U.S. PATENT DOCUMENTS

| | | |
|---|---|---|
| 9,753,124 B2 | 9/2017 | Hayes |
| 2003/0137449 A1* | 7/2003 | Vashisth ................ G01C 11/02 342/357.31 |
| 2004/0217956 A1* | 11/2004 | Besl ........................ G06T 15/00 345/419 |
| 2016/0086353 A1 | 3/2016 | Lukac et al. |
| 2017/0214943 A1 | 7/2017 | Cohen et al. |

* cited by examiner

SORTED GEOMETRY WITH COLOR CLUSTERING (SGCC) FOR POINT CLOUD COMPRESSION

CROSS-REFERENCE TO RELATED APPLICATION(S)

This application claims priority under 35 U.S.C. § 119(e) of the U.S. Provisional Patent Application Ser. No. 62/571,432, filed Oct. 12, 2017 and titled, "SORTED GEOMETRY WITH COLOR CLUSTERING (SGCC) FOR POINT CLOUD COMPRESSION," which is hereby incorporated by reference in its entirety for all purposes.

FIELD OF THE INVENTION

The present invention relates to data compression. More specifically, the present invention relates to point cloud compression.

BACKGROUND OF THE INVENTION

Point clouds are huge data sets of three dimensional points including information such as color and distance. The point clouds are able to be acquired frequently such as when using LIght Detection And Ranging (LIDAR) on a moving vehicle which repeatedly acquires point clouds. Compressing the vast amount of point cloud data is important to enable practical processing of the data.

SUMMARY OF THE INVENTION

A point cloud compression approach that exploits HEVC for compression of both the geometry and color data is described herein. Although both the geometry and color could be compressed in a lossy fashion, the point cloud compression approach is suggested for the scenario of lossless geometry and lossy color coding. Both geometry and color data are first mapped into 2D images and then compressed by HEVC. A sorting technique is used to sort the geometry data to make it as correlated as possible when it is mapped to a 2D image. For color coding, clustering is used to put similar colors in a point cloud into spatial neighbors in the mapped 2D image. This significantly avoids color leaking due to quantization errors to neighbor points in 3D. The results show that much better compression is achieved compared to the Anchor when it is configured for lossless geometry coding.

In one aspect, a method comprises generating a matrix containing a number of points, determining a best sorting order for the number of points in the matrix, sorting the matrix using the best sorting order to generate a sorted matrix, determining an optimum number of clusters, clustering the sorted matrix according to rgb to generate a sorted, augmented matrix, generating a first image and a second image by scanning the sorted, augmented matrix and compressing the first image and the second image. An input to the matrix is a PLY file. The matrix is an N×6 matrix, wherein N is the number of points. A first three columns of the matrix include x, y and z components, and a last three columns of the matrix include r, g, b components. Sorting the matrix includes a plurality of sorting passes. The sorted, augmented matrix includes the matrix with an additional column, wherein the additional column includes cluster labels. The first image comprises color information, and the second image comprises geometry information. The method further comprises outputting a bit stream containing the color information and the geometry information. Compressing the first image and the second image utilizes high efficient video coding.

In another aspect, an apparatus comprises a non-transitory memory for storing an application, the application for: generating a matrix containing a number of points, determining a best sorting order for the number of points in the matrix, sorting the matrix using the best sorting order to generate a sorted matrix, determining an optimum number of clusters, clustering the sorted matrix according to rgb to generate a sorted, augmented matrix, generating a first image and a second image by scanning the sorted, augmented matrix and compressing the first image and the second image and a processor coupled to the memory, the processor configured for processing the application. An input to the matrix is a PLY file. The matrix is an N×6 matrix, wherein N is the number of points. A first three columns of the matrix include x, y and z components, and a last three columns of the matrix include r, g, b components. Sorting the matrix includes a plurality of sorting passes. The sorted, augmented matrix includes the matrix with an additional column, wherein the additional column includes cluster labels. The first image comprises color information, and the second image comprises geometry information. The application is further for outputting a bit stream containing the color information and the geometry information. Compressing the first image and the second image utilizes high efficient video coding.

In another aspect, a system comprises a plurality of camera devices each configured for capturing video content and a computing device configured for: generating a matrix containing a number of points for the video content, determining a best sorting order for the number of points in the matrix, sorting the matrix using the best sorting order to generate a sorted matrix, determining an optimum number of clusters, clustering the sorted matrix according to rgb to generate a sorted, augmented matrix, generating a first image and a second image by scanning the sorted, augmented matrix and compressing the first image and the second image. An input to the matrix is a PLY file. The matrix is an N×6 matrix, wherein N is the number of points. A first three columns of the matrix include x, y and z components, and a last three columns of the matrix include r, g, b components. Sorting the matrix includes a plurality of sorting passes. The sorted, augmented matrix includes the matrix with an additional column, wherein the additional column includes cluster labels. The first image comprises color information, and the second image comprises geometry information. The computing device is further configured for outputting a bit stream containing the color information and the geometry information. Compressing the first image and the second image utilizes high efficient video coding.

DETAILED DESCRIPTION OF THE PREFERRED EMBODIMENT

A point cloud compression approach that exploits High Efficiency Video Coding (HEVC) for compression of both the geometry and color data is described herein. Although both the geometry and color could be compressed in a lossy fashion, the point cloud compression approach is suggested for the scenario of lossless geometry and lossy color coding. Both geometry and color data are first mapped into 2D images and then compressed by HEVC. A sorting technique is used to sort the geometry data to make it as correlated as possible when it is mapped to a 2D image. For color coding, clustering is used to put similar colors in a point cloud into spatial neighbors in the mapped 2D image. This significantly avoids color leaking due to quantization errors to neighbor points in 3D. The results show that much better compression is achieved compared to the Anchor when it is configured for lossless geometry coding.

The point cloud compression method described herein is referred to as Sorted Geometry with Color Clustering (SGCC). To compress geometry, the geometry data is mapped onto a 2D image and then that image is compressed using HEVC. It is assumed that geometry data is 10 bit (that is the case for 8i sequences as well as a "queen" sequence provided by Technicolor) and HEVC 10 bit RExt profile (main_444_10 bit) is used to code the geometry losslessly. The color data is mapped onto another 2D image, and that image is compressed using HEVC. For color, lossy HEVC is used.

Encoding Flow

Figure 1:
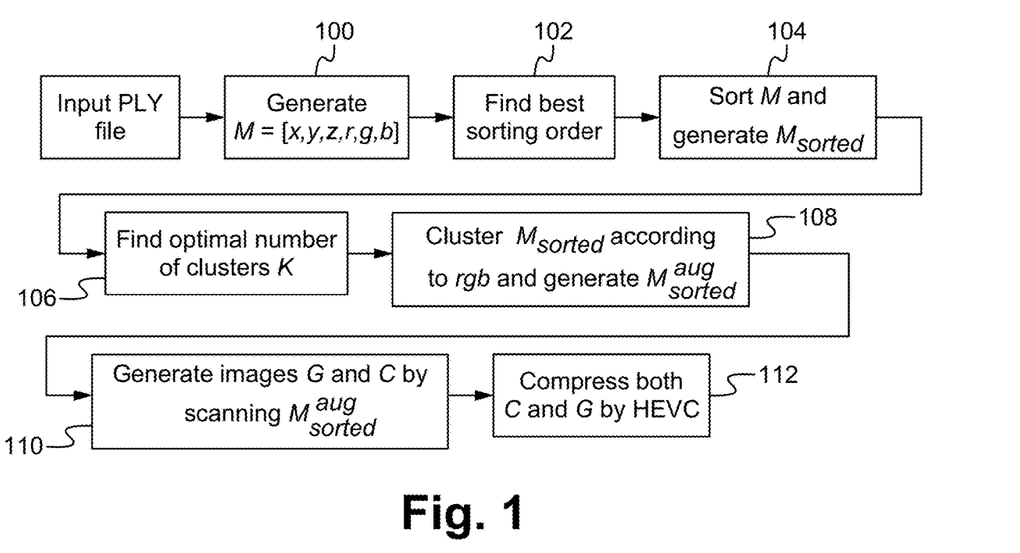
FIG. 1 illustrates a flowchart of a method of implementing SGCC according to some embodiments.

FIG. 1 illustrates a flowchart of a method of implementing SGCC according to some embodiments. The input described herein is a PLY file (although any input is able to be used). In the step 100, Matrix M is generated. In the step 102, a best sorting order is found/determined. In the step 104, M is sorted, and $M_{sorted}$ is generated. In the step 106, an optimal number of clusters K is found. In the step 108, $M_{sorted}$ is clustered according to rgb, and $M_{sorted}^{avg}$ is generated. In the step 110, images G and C are generated by scanning $M_{sorted}^{avg}$. In the step 112, both C and G are compressed by HEVC. At the output, there is a bit stream that contains compressed geometry as well as compressed color. The steps of FIG. 1 are described further herein.

Geometry Compression

An N×6 matrix M is used, where N is the number of points. Matrix M is generated such that the first three columns contain x, y, and z components, and the last three columns contain r, g, and b components, respectively. Each row of M corresponds to a point of the input point cloud and each point appears in M in the order it appears in the input PLY file (as described later, the initial order of the points in M does not matter, since the points are going to be sorted according to the geometry data). Having matrix M, a straightforward geometry compression scenario would be to scan the xyz values into a W×H image, with three channels corresponding to x, y, z components, and compress the resulting image using HEVC. A similar approach could be used to compress the rgb values. However, the xyz (and rgb) data are not necessarily ordered in M such that they are spatially correlated as is required by an image compression tool such as HEVC. HEVC (and other image/video compression standards like JPEG) is mostly optimized for compressing images (and/or image sequences) whose contents are spatially (and/or temporally) correlated. To make the geometry samples as correlated as possible, a sorting scheme is used in which the entire M is sorted according to its first three columns (which contain geometry data). In the following section, the sorting algorithm is described, where sorting is done according to the first (e.g., x), second (e.g., y), and third (e.g., z) columns of M, respectively. Following, the sorting order may not be the optimum one, and an algorithm is used to find the best sorting order.

Sorting

As described herein, the ultimate goal of sorting process is to make the geometry data as correlated as possible to make it amenable to be compressed by HEVC. The process includes three passes of sorting. In the first step, M is sorted according to the best sorting component. The first sorting component is defined as the one which provides the best coding gain if M is sorted according to it firstly; it could be any of x, y, or z. In the second pass, sorting is according to the second best sorting component, and in the third pass sorting is according to the last remaining component. In this section, it is assumed that the best sorting components are already determined to be ordered as x, y, and z. In the next section, it is shown how to derive the best sorting order.

The first pass of sorting includes sorting all the points in M according to the x component in ascending (or descending) order. This makes the x values to be highly correlated. By doing so, the sorting may destroy any correlation that may exist between the samples of other components. For the geometry, the problem is addressed by performing two other passes of sorting on y and z components, and for rgb values, the issue is addressed by doing color clustering.

In the second pass of sorting, the sorted M is divided into P submatrices. Let $M_1, M_2, \ldots, M_P$ denote these submatrices such that for a given submatrix $M_1$, all the elements of the first column are equal. Then all $M_i$'s are sorted according to their second component y. After the second pass of sorting, M still remains sorted according to its first component x. Up to this point, it is able to be said that M is sorted with respect to x, and partially sorted with respect to y. In the third pass of sorting, the sorted M (e.g., output of the second pass) is sorted into submatrices $S_1, S_2, \ldots, S_Q$, such that, for a particular submatrix $S_i$, all the elements of the first column are equal as well as all the elements of the second column. All $S_i$'s are then sorted according to their third component z. At this final stage of sorting, a final sorted M is derived where its first column is completely sorted, while its second and third columns are partially sorted. In addition, sorting with respect to z does not influence the sorted x and y components.

Finding the Best Sorting Order

Should M always be sorted in the order of x, then y, and then z? Could other sorting orders lead to higher compression gains? The sorting order is important. The reason is that data variation in x, y, and z directions could be very different. In addition, even the dynamic range of each of these components could also differ dramatically. For example, for a human performer, y component typically has a higher dynamic range compared to the x and z components. The following algorithm is a way to find the best sorting order:

Let $u_x$, $u_y$, $u_z$ denote the unitary vectors (1,0,0), (0,1,0), (0,0,1), which respectively correspond to the x, y, and z components. The best sorting order is obtained by:

1—Compute the Eigen vectors of covariance matrix M'×M, denoted by $v_1$, $v_2$, $v_3$, where $v_i$ corresponds to the ith largest Eigen value.

2—The best sorting component is derived by:

$u_{i*}$=arg min $u_i \cdot v_1$, where $i \in \{x,y,z\}$, and $u_i \cdot v_1$ is the dot product of $u_i$ and $v_1$.

3—The second best sorting component is derived by:

$u_{j*}$=arg ming $u_i \cdot v_2$, where $i \in \{x,y,z\} - i*$.

Color Compression

Up to this point, a matrix $M_{sorted}$ is generated that is sorted according to its xyz components. As mentioned previously, geometry sorting might have destroyed any correlations that may have been present in the unsorted input M. Like geometry compression, a simple color compression scenario could be to scan the rgb values of $M_{sorted}$ into a W×H image and then compress that image using HEVC. Experiments show that a much better color compression is able to be achieved by doing color clustering. Quantization errors due to compressing the mapped 2D image could significantly degrade the quality of the reconstructed point cloud for any technique that maps 3D color data to 2D and then performs compression in 2D domain. The color clustering step implicitly takes care of this problem and leads to reconstructed clouds with better color qualities.

Let $M_{sorted}^{avg}$ denote an augmented version of $M_{sorted}$ with N rows and 7 columns, such that the first 6 columns of $M_{sorted}^{avg}$ contain $M_{sorted}$. The last column of $M_{sorted}^{avg}$ represents a label that is derived for each point according to its rgb value. To derive a label for each point, K-means clustering (any other clustering method could be used) is performed using only the rgb values. Once clustering is done, the last column of $M_{sorted}^{avg}$ is filled with K labels. It is clearly observed that the rgb values of the points with the same label are highly correlated. This implies that if the rgb values of the points with the same label in $M_{sorted}^{avg}$ are scanned sequentially and put into a 2D image, they could be compressed efficiently using HEVC. Inspired by this idea, the two final images to be compressed by HEVC are generated via the below procedure:

1—Generate two W×H images. One, denoted by G, is 10 bit to keep xyz and the other, denoted by C, is 8 bit to keep rgb values. Throughout the below procedure, G and C are filled via scan lines, and filling starts from the top-left pixel.

2—l←1;

3—In $M_{sorted}^{avg}$, find all points with label l;

4—Scan xyz of these points sequentially and put them G;

5—Scan rgb of these points sequentially and put them in C;

6—l←l+1;

7—If l==K+1:

terminate;

8—Else:

go to 3.

Finally, G is compressed using HEVC RExt, and C is compressed using lossy HEVC.

Algorithm to Approximate Optimal Number of Clusters

Figure 2:
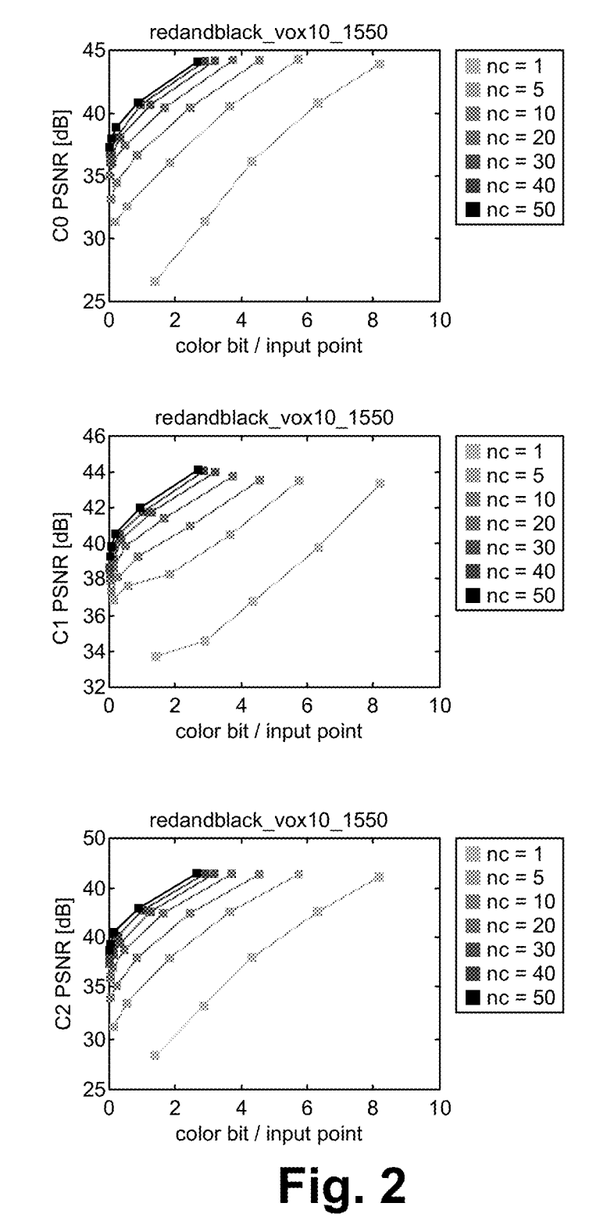
FIG. 2 illustrates charts showing increasing the number of clusters (denoted by "nc") leads to higher color coding games according to some embodiments.

An important item that should be considered is that there is a trade-off between geometry compression and color compression. More precisely, to improve color coding efficiency, rgb samples are able to be made more and more correlated by increasing the number of clusters (see FIG. 2). However, although the rgb values of points with the same label are correlated, the same correlation may not apply to the xyz of these points, and by increasing the number of clusters K, the correlation that was generated via the sorting algorithm is lessened. This implies that there is a trade-off between the color compression and geometry compression, and choosing a good K is important (see FIG. 3). The question is what is the optimum number of clusters K? It could be intuitively said that the optimum K depends on the content of the tested point cloud. For example, for "redandblack" sequence, a smaller K will be the best answer compared to the "longdress" sequence, since a smaller variety of colors are observed in "redandblack" compared to "longdress." In addition, as discussed above, K indirectly influences the geometry coding gain and the way it does so is complicated to quantify. An algorithm to derive a good estimate for the optimum value of K is described herein. Using this algorithm, a particular fixed threshold is set which works sufficiently well for all the tested sequences.

The algorithm implements a second pass of clustering on rgb values of sorted M; thus, the final process includes two passes of clustering: one to determine the optimum K, and another one to cluster $M_{sorted}$.

The idea is to first cluster rgb values using a large number of clusters in the first pass, and then prune the cluster centers (based on a predetermined threshold) such that the cluster centers are as distant as possible. The final number of clusters is the number of centers obtained after pruning. Below is an algorithm:

Input: rgb matrix, an initial large number of clusters N, threshold T:

Ouput: refined number of clusters, N'

1—Cluster rgb data into N clusters. Denote the centers of clusters obtained by C=[$C_1$, $C_2$, ..., $C_N$];

2— Compute $D_{max} = \max |c_i - c_j|$ over $c_i, c_j \in C$;

$C' \leftarrow c_1$;

3— For $c_i \in C - c_1$:

If $|c_i - c'_j| > \frac{D_{max}}{T}$ for all $c'_j \in C$:

$C' \leftarrow C' \cup c_i$;

4— $N' \leftarrow |C'|$, where |C'| represents cardinality of the set C'. In experiments, the initial number of clusters was set to 100, and the threshold to 10.

|  | Estimate of optimal number of clusters given by the algorithm |
| --- | --- |
| redandblack_vox10_1550 | 18 |
| longdress_vox10_1300 | 38 |
| loot_vox10_1200 | 15 |
| soldier_vox10_0690 | 9 |
| queen_frame_0200 | 25 |

Table 1 shows the optimal number of clusters obtained by the above algorithm for N=100 and T=10.

Figure 3:
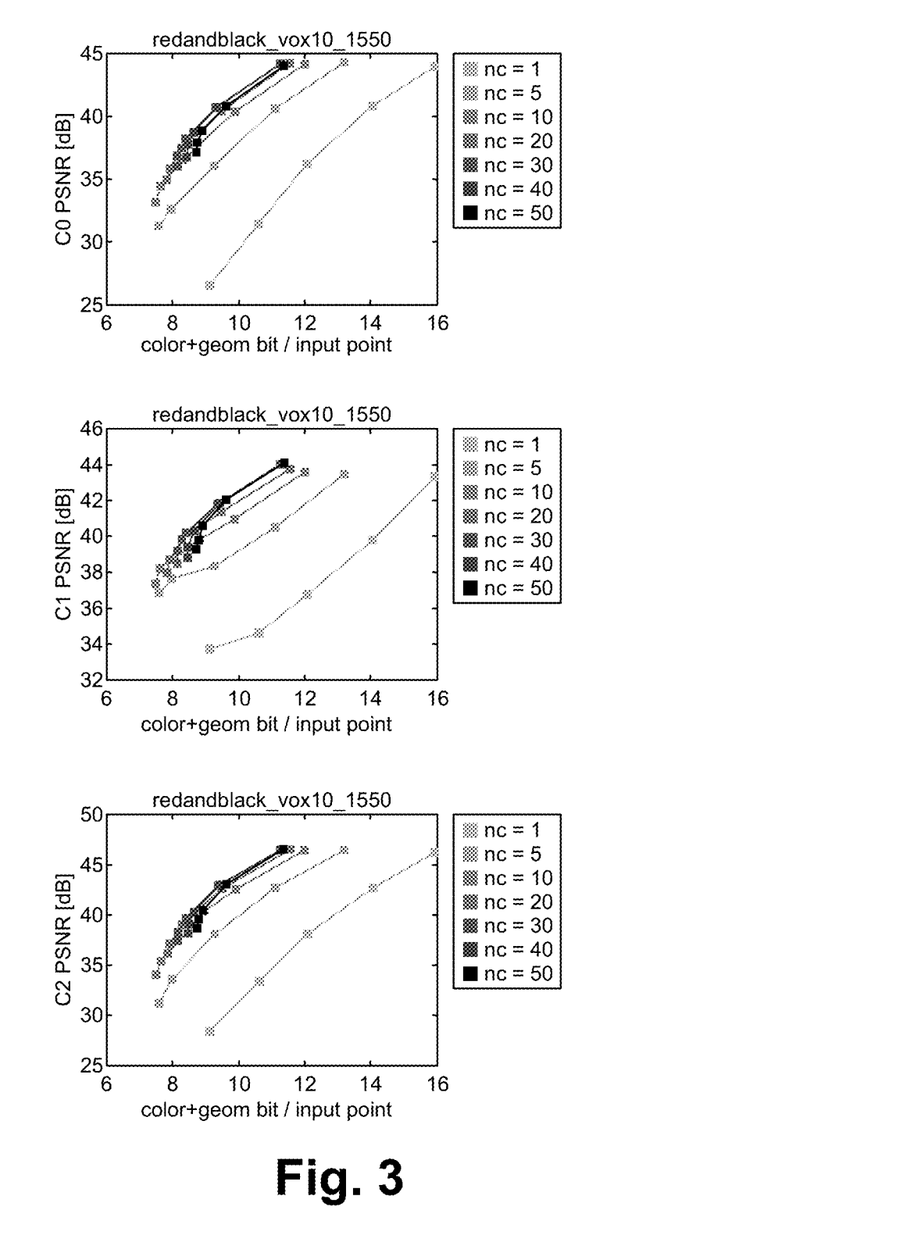
FIG. 3 illustrates the trade-off between color compression and geometry compression, where increasing nc leads to higher total coding gains, which is due to better color coding gain, further increasing "nc" leads to a total coding loss, which is due to coding loss according to some embodiments.

For redandblack, the estimate of 21 closely matches the optimum number of clusters according to FIG. 3. Also, the estimates correlate with the color variance of a particular point cloud. For example, for "soldier," a small number of clusters is good enough, while for "longdress" a larger number of clusters is helpful.

Compression Performance

Figure 4:
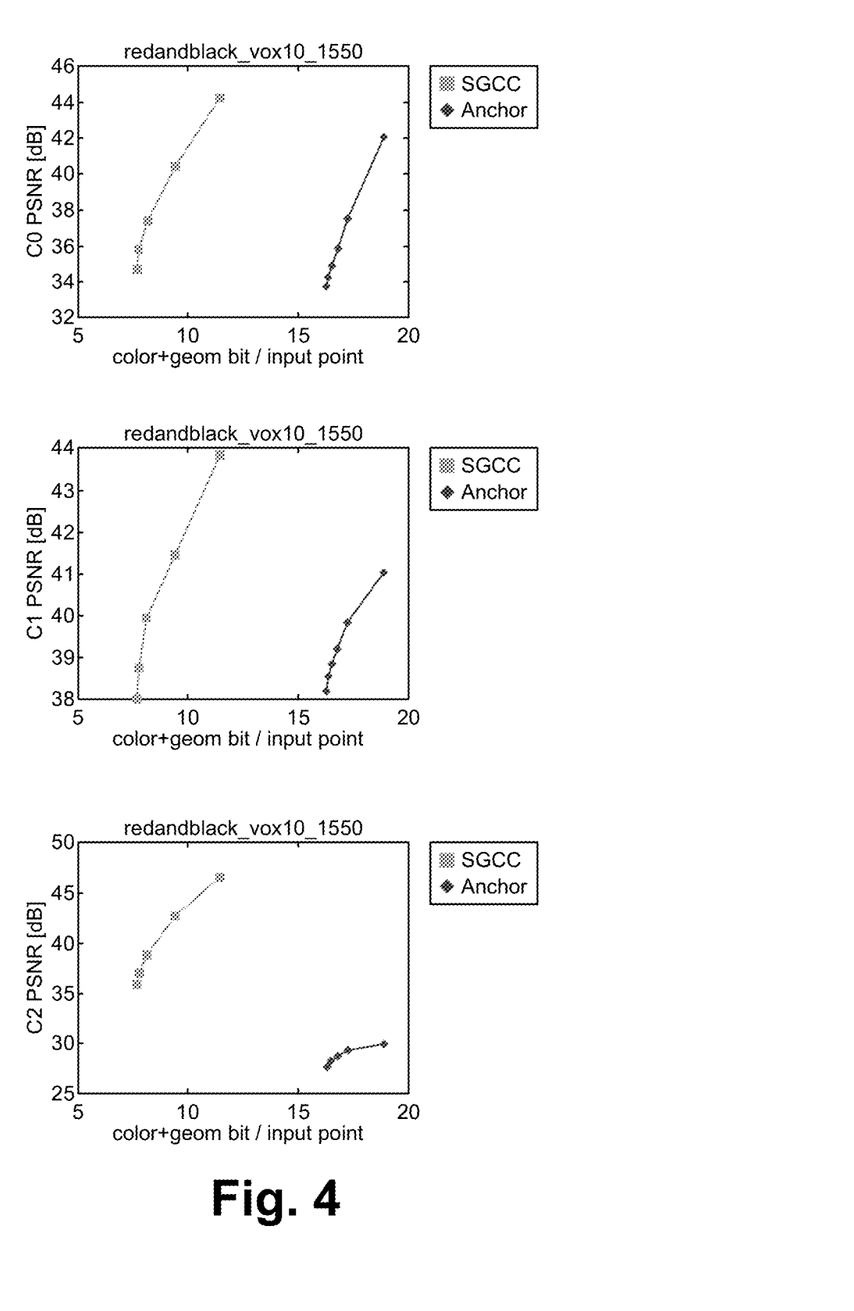
FIG. 4 illustrates SGCC and Anchor RD-curves for "redandblack" according to some embodiments.
Figure 5:
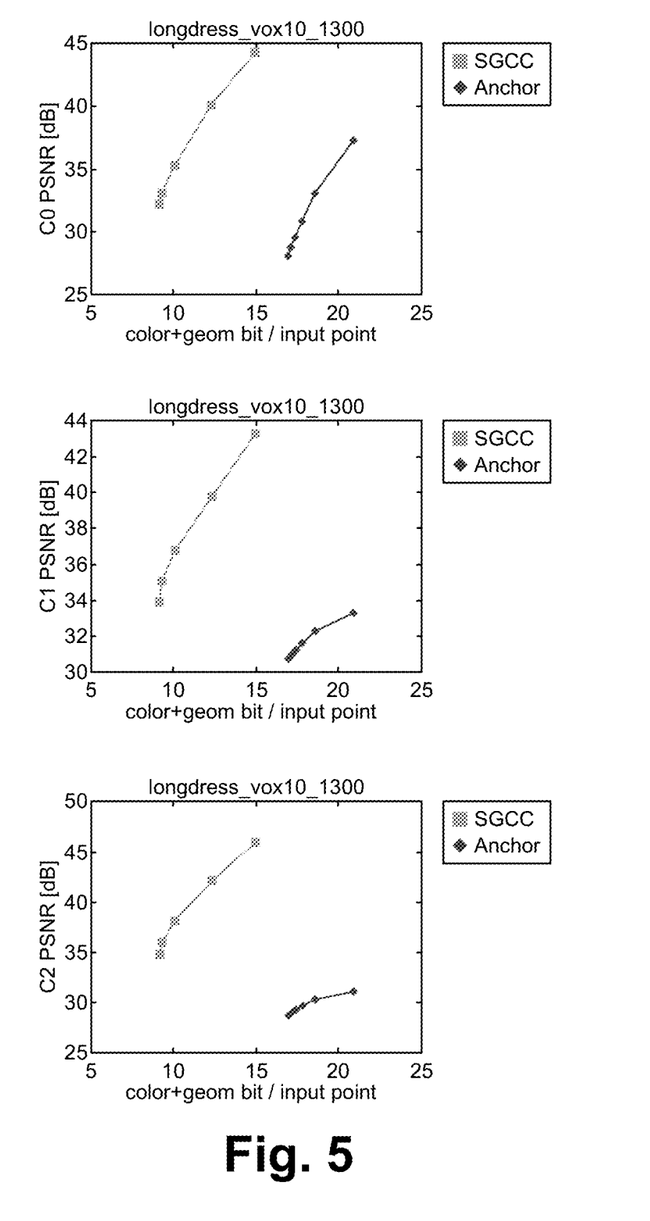
FIG. 5 illustrates SGCC and Anchor RD-curves for "longdress" according to some embodiments.
Figure 6:
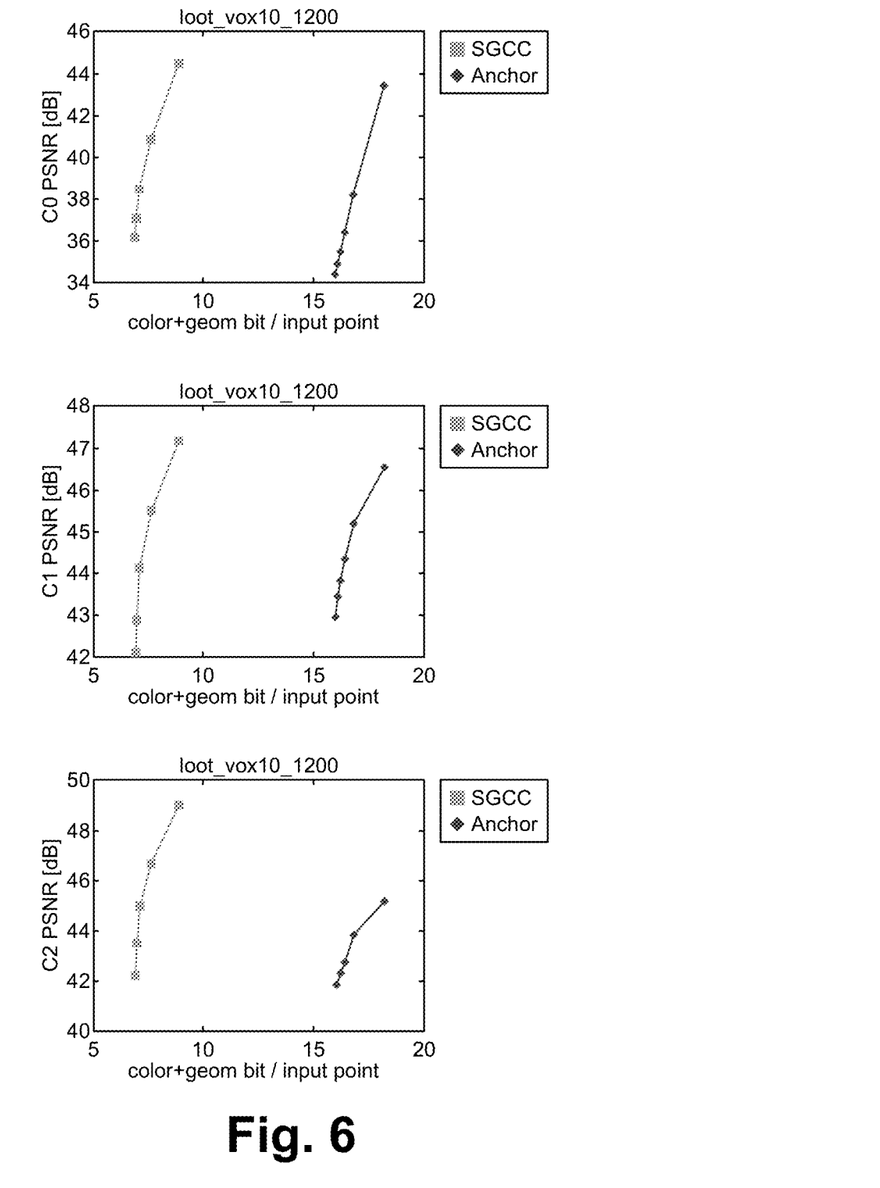
FIG. 6 illustrates SGCC and Anchor RD-curves for "loot" according to some embodiments.
Figure 7:
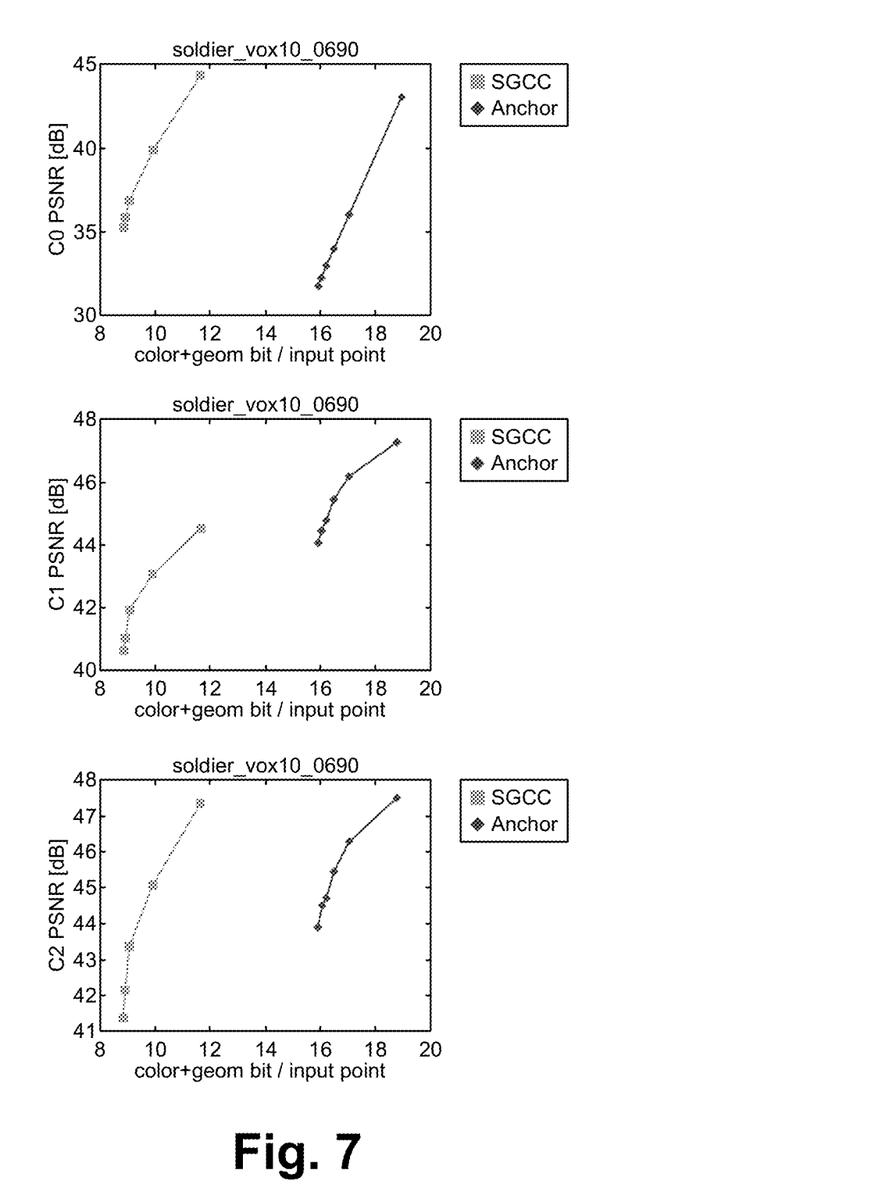
FIG. 7 illustrates SGCC and Anchor RD-curves for "soldier" according to some embodiments.
Figure 8:
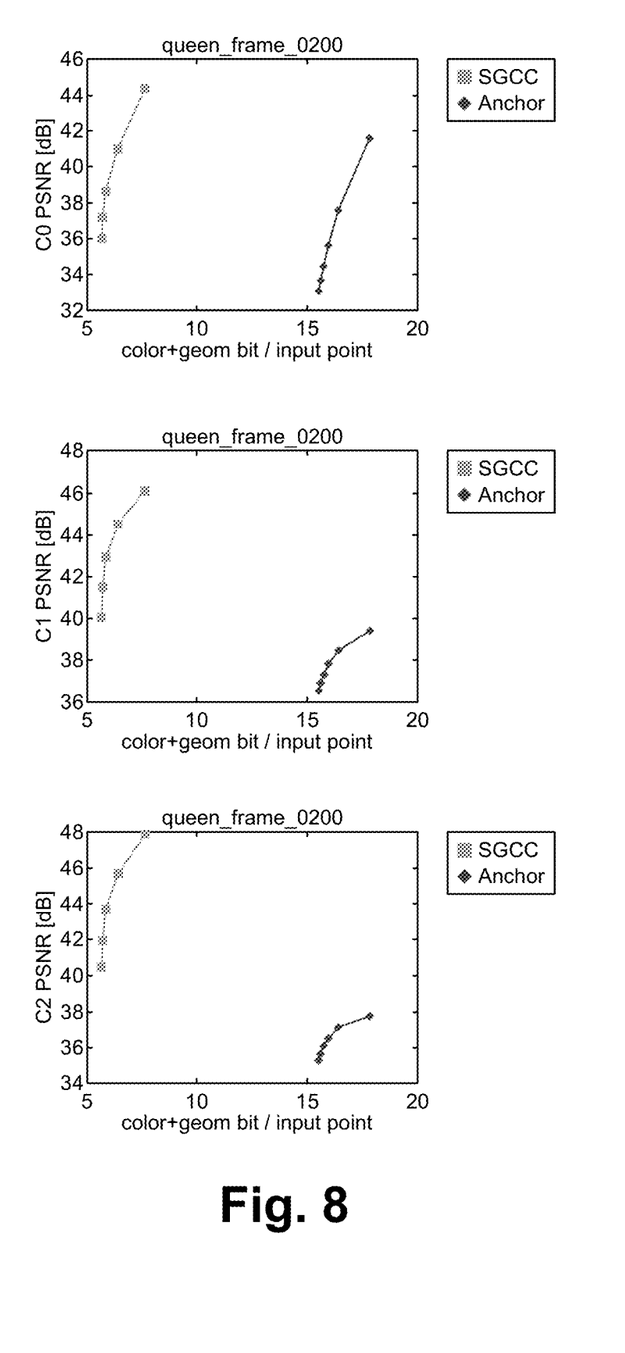
FIG. 8 illustrates SGCC and Anchor RD-curves for "queen" according to some embodiments.

The compression efficiency of SGCC is compared to that of Anchor. For Anchor PCC, LoD is set to 13 which approximately yields lossless geometry coding. FIG. 4 shows the RD curves for redandblack. It is evident that SGCC significantly outperforms Anchor. FIG. 5 to FIG. 8 show the results for other sequences. All of the results confirm that SGCC performs better than Anchor.

|  | C0 [dB] | C1 [dB] | C2 [dB] |
|---|---|---|---|
| redandblack_vox10_1550 | 101.8% | 117.52% | 20795.77% |
| longdress_vox10_1300 | 96.72% | 1856.55% | 20645.53% |
| loot_vox10_1200 | 131.35% | 126.16% | 171.11% |
| soldier_vox10_0690 | 83.52% | 34.10% | 67.72% |
| queen_frame_0200 | 178.44% | 731.23% | 494.42% |

Table 2 compares the geometry compression efficiency of Anchor with that of SGCC.

|  | Anchor (LoD = 13, which approximately corresponds to lossless geometry compression) | SGCC (exact lossless geometry compression) |
|---|---|---|
| redandblack_vox10_550 | 15.68 | 7.65 |
| longdress_vox10_1300 | 15.78 | 9.08 |
| loot_vox10_1200 | 15.43 | 6.87 |
| soldier_vox10_0690 | 15.13 | 8.84 |
| queen_frame_0200 | 14.94 | 5.63 |

Table 3 shows the BD rates of the RD curves given in FIG. 4 to FIG. 8.

Figure 9:
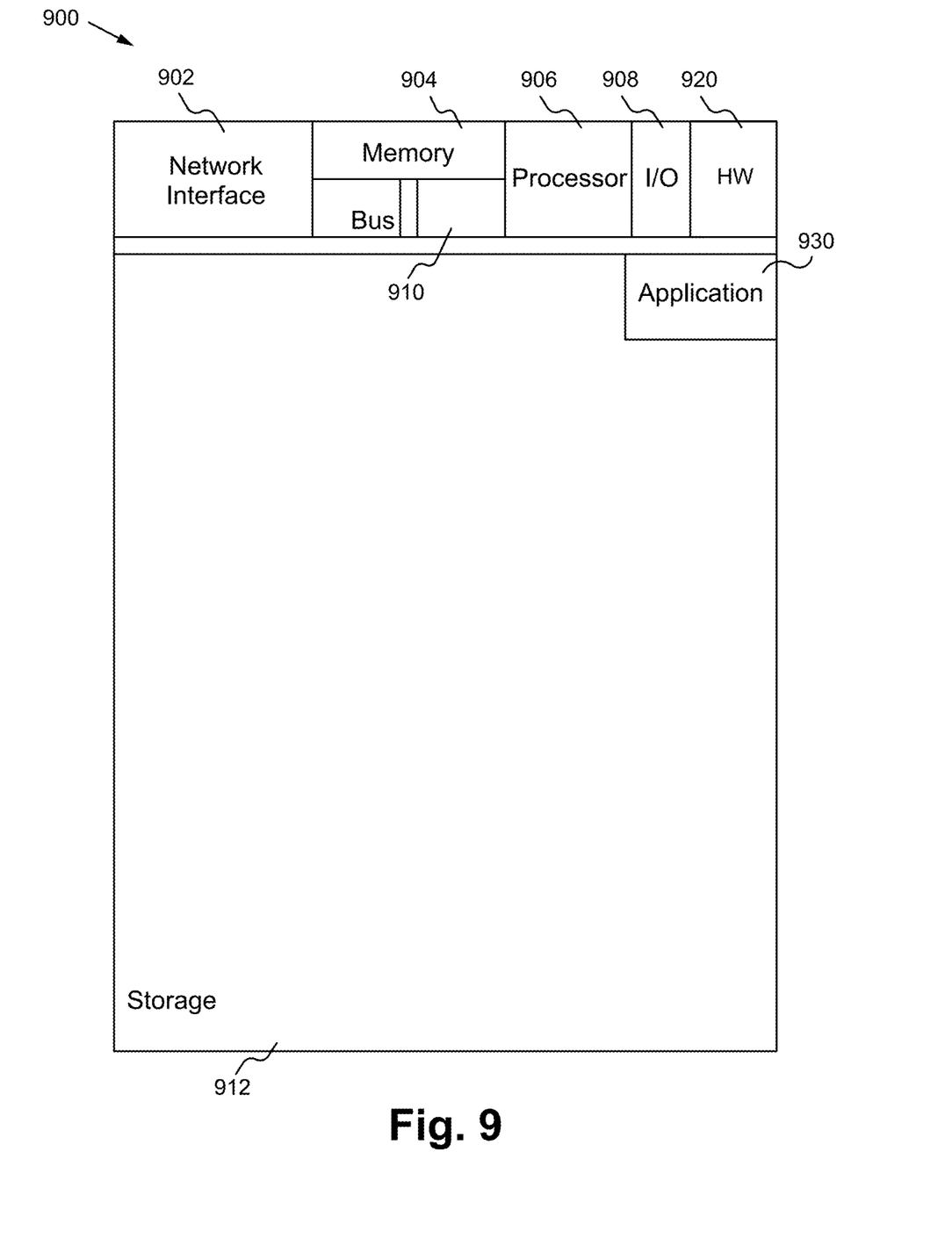
FIG. 9 illustrates a block diagram of an exemplary computing device configured to implement the SGCC for point cloud compression according to some embodiments.

FIG. 9 illustrates a block diagram of an exemplary computing device configured to implement the SGCC for point cloud compression according to some embodiments. The computing device 900 is able to be used to acquire, store, compute, process, communicate and/or display information such as images and videos. The computing device 900 is able to implement any of the SGCC for point cloud compression aspects. In general, a hardware structure suitable for implementing the computing device 900 includes a network interface 902, a memory 904, a processor 906, I/O device(s) 908, a bus 910 and a storage device 912. The choice of processor is not critical as long as a suitable processor with sufficient speed is chosen. The memory 904 is able to be any conventional computer memory known in the art. The storage device 912 is able to include a hard drive, CDROM, CDRW, DVD, DVDRW, High Definition disc/drive, ultra-HD drive, flash memory card or any other storage device. The computing device 900 is able to include one or more network interfaces 902. An example of a network interface includes a network card connected to an Ethernet or other type of LAN. The I/O device(s) 908 are able to include one or more of the following: keyboard, mouse, monitor, screen, printer, modem, touchscreen, button interface and other devices. SGCC for point cloud compression application(s) 930 used to implement the SGCC for point cloud compression are likely to be stored in the storage device 912 and memory 904 and processed as applications are typically processed. More or fewer components shown in FIG. 9 are able to be included in the computing device 900. In some embodiments, SGCC for point cloud compression hardware 920 is included. Although the computing device 900 in FIG. 9 includes applications 930 and hardware 920 for the SGCC for point cloud compression, the SGCC for point cloud compression is able to be implemented on a computing device in hardware, firmware, software or any combination thereof. For example, in some embodiments, the SGCC for point cloud compression applications 930 are programmed in a memory and executed using a processor. In another example, in some embodiments, the SGCC for point cloud compression hardware 920 is programmed hardware logic including gates specifically designed to implement the SGCC for point cloud compression.

In some embodiments, the SGCC for point cloud compression application(s) 930 include several applications and/or modules. In some embodiments, modules include one or more sub-modules as well. In some embodiments, fewer or additional modules are able to be included.

In some embodiments, the SGCC for point cloud compression hardware 920 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize SGCC for point cloud compression described herein, devices such as digital cameras/camcorders are used to acquire content. The SGCC for point cloud compression is able to be implemented with user assistance or automatically without user involvement to efficiently encode, transmit, decode and render the content.

In operation, the SGCC for point cloud compression significantly avoids color leaking due to quantization errors to neighbor points in 3D. The results show that much better compression is achieved with SGCC for point cloud compression compared to the Anchor when it is configured for lossless geometry coding.

Some Embodiments of Sorted Geometry with Color Clustering (SGCC) for Point Cloud Compression 1. A method comprising:
   generating a matrix containing a number of points;
   determining a best sorting order for the number of points in the matrix;
   sorting the matrix using the best sorting order to generate a sorted matrix;
   determining an optimum number of clusters;
   clustering the sorted matrix according to rgb to generate a sorted, augmented matrix;
   generating a first image and a second image by scanning the sorted, augmented matrix; and
   compressing the first image and the second image.

2. The method of clause 1 wherein an input to the matrix is a PLY file.

3. The method of clause 1 wherein the matrix is an N×6 matrix, wherein N is the number of points.

4. The method of clause 1 wherein a first three columns of the matrix include x, y and z components, and a last three columns of the matrix include r, g, b components.

5. The method of clause 1 wherein sorting the matrix includes a plurality of sorting passes.
6. The method of clause 1 wherein the sorted, augmented matrix includes the matrix with an additional column, wherein the additional column includes cluster labels.
7. The method of clause 1 wherein the first image comprises color information, and the second image comprises geometry information.
8. The method of clause 7 further comprising outputting a bit stream containing the color information and the geometry information.
9. The method of clause 1 wherein compressing the first image and the second image utilizes high efficient video coding.
10. An apparatus comprising:
a non-transitory memory for storing an application, the application for:
generating a matrix containing a number of points;
determining a best sorting order for the number of points in the matrix;
sorting the matrix using the best sorting order to generate a sorted matrix;
determining an optimum number of clusters;
clustering the sorted matrix according to rgb to generate a sorted, augmented matrix;
generating a first image and a second image by scanning the sorted, augmented matrix; and
compressing the first image and the second image; and
a processor coupled to the memory, the processor configured for processing the application.
11. The apparatus of clause 10 wherein an input to the matrix is a PLY file.
12. The apparatus of clause 10 wherein the matrix is an N×6 matrix, wherein N is the number of points.
13. The apparatus of clause 10 wherein a first three columns of the matrix include x, y and z components, and a last three columns of the matrix include r, g, b components.
14. The apparatus of clause 10 wherein sorting the matrix includes a plurality of sorting passes.
15. The apparatus of clause 10 wherein the sorted, augmented matrix includes the matrix with an additional column, wherein the additional column includes cluster labels.
16. The apparatus of clause 10 wherein the first image comprises color information, and the second image comprises geometry information.
17. The apparatus of clause 16 wherein the application is further for outputting a bit stream containing the color information and the geometry information.
18. The apparatus of clause 10 wherein compressing the first image and the second image utilizes high efficient video coding.
19. A system comprising:
a plurality of camera devices each configured for capturing video content; and
a computing device configured for:
generating a matrix containing a number of points for the video content;
determining a best sorting order for the number of points in the matrix;
sorting the matrix using the best sorting order to generate a sorted matrix;
determining an optimum number of clusters;
clustering the sorted matrix according to rgb to generate a sorted, augmented matrix;
generating a first image and a second image by scanning the sorted, augmented matrix; and
compressing the first image and the second image.
20. The system of clause 19 wherein an input to the matrix is a PLY file.
21. The system of clause 19 wherein the matrix is an N×6 matrix, wherein N is the number of points.
22. The system of clause 19 wherein a first three columns of the matrix include x, y and z components, and a last three columns of the matrix include r, g, b components.
23. The system of clause 19 wherein sorting the matrix includes a plurality of sorting passes.
24. The system of clause 19 wherein the sorted, augmented matrix includes the matrix with an additional column, wherein the additional column includes cluster labels.
25. The system of clause 19 wherein the first image comprises color information, and the second image comprises geometry information.
26. The system of clause 26 wherein the computing device is further configured for outputting a bit stream containing the color information and the geometry information.
27. The system of clause 19 wherein compressing the first image and the second image utilizes high efficient video coding.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method comprising:
generating a matrix containing a number of points, wherein the number of points comprise geometry data and further wherein a first three columns of the matrix include x, y and z components, and a last three columns of the matrix include r, g, b components;
determining a best sorting order for the geometry data in the matrix, wherein the best sorting order is based on a correlation of the geometry data with a two dimensional image and computing a largest Eigen value from the vectors of the matrix;
sorting the matrix using the best sorting order to generate a sorted matrix;
determining an optimum number of clusters based on a label that is derived from each rgb value;
clustering the sorted matrix according to rgb to generate a sorted, augmented matrix;
generating a first image and a second image by scanning the sorted, augmented matrix; and
compressing the first image and the second image.
2. The method of claim 1 wherein an input to the matrix is a PLY file.
3. The method of claim 1 wherein the matrix is an N×6 matrix, wherein N is the number of points.
4. The method of claim 1 wherein sorting the matrix includes a plurality of sorting passes.
5. The method of claim 1 wherein the sorted, augmented matrix includes the matrix with an additional column, wherein the additional column includes cluster labels.
6. The method of claim 1 wherein the first image comprises color information, and the second image comprises geometry information.

7. The method of claim 6 further comprising outputting a bit stream containing the color information and the geometry information.

8. The method of claim 1 wherein compressing the first image and the second image utilizes high efficient video coding.

9. An apparatus comprising:
a non-transitory memory for storing an application, the application for:
generating a matrix containing a number of points, wherein the number of points comprise geometry data and further wherein a first three columns of the matrix include x, y and z components, and a last three columns of the matrix include r, g, b components;
determining a best sorting order for the geometry data in the matrix, wherein the best sorting order is based on a correlation of the geometry data with a two dimensional image and computing a largest Eigen value from the vectors of the matrix;
sorting the matrix using the best sorting order to generate a sorted matrix;
determining an optimum number of clusters based on a label that is derived from each rgb value;
clustering the sorted matrix according to rgb to generate a sorted, augmented matrix;
generating a first image and a second image by scanning the sorted, augmented matrix; and
compressing the first image and the second image; and
a processor coupled to the memory, the processor configured for processing the application.

10. The apparatus of claim 9 wherein an input to the matrix is a PLY file.

11. The apparatus of claim 9 wherein the matrix is an N×6 matrix, wherein N is the number of points.

12. The apparatus of claim 9 wherein sorting the matrix includes a plurality of sorting passes.

13. The apparatus of claim 9 wherein the sorted, augmented matrix includes the matrix with an additional column, wherein the additional column includes cluster labels.

14. The apparatus of claim 9 wherein the first image comprises color information, and the second image comprises geometry information.

15. The apparatus of claim 14 wherein the application is further for outputting a bit stream containing the color information and the geometry information.

16. The apparatus of claim 9 wherein compressing the first image and the second image utilizes high efficient video coding.

17. A system comprising:
a plurality of camera devices each configured for capturing video content; and
a computing device configured for:
generating a matrix containing a number of points for the video content, wherein the number of points comprise geometry data and further wherein a first three columns of the matrix include x, y and z components, and a last three columns of the matrix include r, g, b components;
determining a best sorting order for the geometry data in the matrix, wherein the best sorting order is based on a correlation of the geometry data with a two dimensional image and computing a largest Eigen value from the vectors of the matrix;
sorting the matrix using the best sorting order to generate a sorted matrix;
determining an optimum number of clusters is based on a label that is derived from each rgb value;
clustering the sorted matrix according to rgb to generate a sorted, augmented matrix;
generating a first image and a second image by scanning the sorted, augmented matrix; and
compressing the first image and the second image.

18. The system of claim 17 wherein an input to the matrix is a PLY file.

19. The system of claim 17 wherein the matrix is an N×6 matrix, wherein N is the number of points.

20. The system of claim 17 wherein sorting the matrix includes a plurality of sorting passes.

21. The system of claim 17 wherein the sorted, augmented matrix includes the matrix with an additional column, wherein the additional column includes cluster labels.

22. The system of claim 17 wherein the first image comprises color information, and the second image comprises geometry information.

23. The system of claim 22 wherein the computing device is further configured for outputting a bit stream containing the color information and the geometry information.

24. The system of claim 17 wherein compressing the first image and the second image utilizes high efficient video coding.

* * * * *